United States Patent
Kamata et al.

(10) Patent No.: US 9,007,530 B2
(45) Date of Patent: Apr. 14, 2015

(54) CHANNEL SCAN DEVICE AND METHOD, AND PROGRAM

(71) Applicant: Sony Corporation, Minato-ku (JP)

(72) Inventors: Hiroyuki Kamata, Kanagawa (JP); Hideyuki Matsumoto, Tokyo (JP); Yuichi Hirayama, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/350,981

(22) PCT Filed: Nov. 14, 2012

(86) PCT No.: PCT/JP2012/079465
§ 371 (c)(1),
(2) Date: Apr. 10, 2014

(87) PCT Pub. No.: WO2013/077227
PCT Pub. Date: May 30, 2013

(65) Prior Publication Data
US 2014/0267929 A1   Sep. 18, 2014

(30) Foreign Application Priority Data
Nov. 25, 2011   (JP) ................... 2011-257444

(51) Int. Cl.
*H04N 5/50*   (2006.01)
*H04N 21/43*   (2011.01)
(Continued)

(52) U.S. Cl.
CPC ............ *H04N 5/50* (2013.01); *H04N 21/4302* (2013.01); *H04N 21/4263* (2013.01); *H04N 21/4384* (2013.01)

(58) Field of Classification Search
USPC ......... 348/731, 732, 733, 725, 726, 729, 553; 375/316, 345, 260, 324, 326, 340, 343; 455/232.1, 234.1, 277.1, 346, 66.1
IPC ........................................ H04N 5/50
See application file for complete search history.

(56) References Cited

U.S. PATENT DOCUMENTS 6,128,352 A * 10/2000 Maeda .................... 375/316
7,174,145 B2 * 2/2007 Chatelier et al. ......... 455/277.1
(Continued)

FOREIGN PATENT DOCUMENTS

| JP | 10-145188 | 5/1998 |
| JP | 2002-218335 | 8/2002 |

(Continued)

OTHER PUBLICATIONS

International Search Report issued Jan. 29, 2013, in International Application No. PCT/JP2012/079465.

*Primary Examiner* — Trang U Tran
(74) *Attorney, Agent, or Firm* — Oblon, McClelland, Maier & Neustadt, L.L.P.

(57) ABSTRACT

The present technique relates to a channel scan device and method, and a program configured so that high-speed channel scan is enabled.

The power spectrum extracting unit 31 of the decoding unit 22 extracts a power level for each frequency of an input signal as a power spectrum, and supplies the power level to the channel scan processing unit 23. The channel scan processing unit 23 extracts a trapezoidal band, which constitutes a power spectrum waveform, in a power spectrum as a channel candidate, and extracts a channel, for which synchronization of a clock and synchronization of a TS required for reproduction of audio and video can be confirmed, as a valid channel. The present technique can be applied to a television receiver.

11 Claims, 14 Drawing Sheets

(51) Int. Cl.
*H04N 21/426* (2011.01)
*H04N 21/438* (2011.01)

(56) References Cited

U.S. PATENT DOCUMENTS 7,221,412 B2 * 5/2007 Shibusawa .................... 348/732
8,194,806 B2 * 6/2012 Okazaki et al. ............... 375/345
2002/0097344 A1 7/2002 Shibusawa
2011/0069747 A1 3/2011 Berlotserkovsky et al.

FOREIGN PATENT DOCUMENTS

| JP | 2009-5352 | 1/2009 |
| JP | 2011-523837 | 8/2011 |

* cited by examiner

CHANNEL SCAN DEVICE AND METHOD, AND PROGRAM

TECHNICAL FIELD

The present technique relates to a channel scan device and method, and a program, and relates more particularly to a channel scan device and method, and a program configured so that high-speed channel scan can be realized.

BACKGROUND ART

Automatic channel detection technique in a television receiver has become popular in the general public.

Thereamong, satellite broadcasting in Europe especially needs an enormous amount of time for channel detection, since no regulation on a symbol rate (signal bandwidth) exists and signals having different symbol rates coexist.

As technique to speed up such channel detection, technique of measuring and storing reception power of a transmission band, calculating square power with a sliding frequency window, and selecting a valid channel on the basis of the square power has been proposed (see Patent Document

CITATION LIST

Non-Patent Document

Patent Document 1: JP 2009-005352 A

SUMMARY OF THE INVENTION

Problems to be Solved by the Invention

The technique in Patent Document 1, however, has a possibility that channel detection needs an enormous amount of time, since it is required to calculate square power for all combinations of all bands and all sliding frequency windows.

The present technique has been made in view of such a situation, and more particularly is configured so that high-speed channel scan without missing of reading can be realized by utilizing a power spectrum of reception power for a frequency in a reception environment.

Solutions to Problems

A power spectrum extracting unit that extracts a power level for each frequency of an input signal as a power spectrum, and a first channel candidate extracting unit that estimates that a trapezoidal range of a waveform, which constitutes the power spectrum, is a channel candidate and extracting the range, are included.

It is possible to cause the first channel candidate extracting unit to estimate that a center position and a width of the trapezoidal range of a waveform, which constitutes the power spectrum, are a center frequency and a symbol rate of the channel candidate.

A second channel candidate extracting unit that extracts a channel candidate having a symbol rate lower than a predetermined symbol rate, by a procedure similar to a procedure of the first channel candidate extracting unit, from a band excluding a band, from which a channel candidate having a symbol rate higher than the predetermined symbol rate has been extracted, after a channel candidate having a symbol rate higher than the predetermined symbol rate is extracted from all bands by the first channel candidate extracting unit can be further included.

It is possible to cause the first channel candidate extracting unit to compensate a waveform, which includes a tilt component constituted of a predetermined slope, in a waveform of the power spectrum, and then extract a trapezoidal range of a waveform in the power spectrum as a channel candidate.

A low-pass filter for extracting the tilt component from a waveform of a power spectrum including the tilt component as a low-frequency component, and a subtracter for subtracting a tilt component extracted by the low-pass filter from a waveform including the tilt component can be further included. It is possible to cause the first channel candidate extracting unit to control the low-pass filter to extract a tilt component from a waveform of a power spectrum including the tilt component, and further control the subtracter to subtract a tilt component extracted by the low-pass filter from a waveform including the tilt component, so as to compensate a waveform including the tilt component and then extract the trapezoidal range in a waveform of the compensated power spectrum as a channel candidate.

It is possible to cause the first channel candidate extracting unit to extract a plurality of adjoining trapezoidal ranges of trapezoidal ranges of a waveform of the power spectrum as one channel candidate.

A third channel candidate extracting unit that extracts a trapezoidal range, which constitutes a waveform of a power spectrum composed of a peak position of the power spectrum and two positions lower than the peak position by a predetermined value, as a channel candidate for a band excluding a band, from which a channel candidate has been extracted by the first channel candidate extracting unit, can be included.

It is possible to cause the third channel candidate extracting unit to detect two positions lower than the peak position by a predetermined value by finding, in chronological order, values of a power spectrum at positions spaced from the peak position by stepwise distances for a band excluding a band, from which a channel candidate has been extracted by the first channel candidate extracting unit, and extract a trapezoidal range of a waveform of a power spectrum, which is composed of a peak position of the power spectrum and two positions lower than the peak position by a predetermined value, as a channel candidate.

A channel confirming unit that confirms whether one of channel candidates extracted by the channel candidate extracting unit is valid as a channel or not, and a channel storing unit that stores a channel which has been confirmed by the channel confirming unit as a valid channel can be included.

A clock synchronization confirming unit that confirms whether a clock required at an early stage in a demodulation process of a signal for the channel candidate can be synchronized or not, and a transport stream synchronization confirming unit that confirms whether synchronous reproduction of the transport stream at a final stage in the demodulation process for a channel candidate for which synchronization has been confirmed by the clock synchronization confirming unit can be achieved or not can be further included. It is possible to cause the channel confirming unit to confirm a channel candidate, for which it has been confirmed by the transport stream synchronization confirming unit that the transport stream can be reproduced, of channel candidates extracted by the channel candidate extracting unit as a valid channel.

A channel scan method according to one aspect of the present technique is a channel scan method of a channel scan device, including the steps of performing a power spectrum extracting process to extract a power level for each frequency of an input signal as a power spectrum, and performing a first channel candidate extracting process to estimate that a trapezoidal range of a waveform, which constitutes the power spectrum, is a channel candidate and extract the range.

A program according to one aspect of the present technique causes a computer for controlling a channel scan device to function as a power spectrum extracting unit that extracts a power level for each frequency of an input signal as a power spectrum, and a first channel candidate extracting unit that estimates that a trapezoidal range of a waveform, which constitutes the power spectrum, is a channel candidate and extracting the range.

In one aspect of the present technique, a power level for each frequency of an input signal is extracted as a power spectrum, and a trapezoidal range of a waveform, which constitutes a power spectrum, is estimated to be a channel candidate and is extracted.

A channel scan device of the present technique may be an independent device or may be a block for performing a channel scan process.

Effects of the Invention

With one aspect of the present technique, it becomes possible to detect a channel from an input signal at high speed.

MODES FOR CARRYING OUT THE INVENTION

[Structure Example of Signal Processing Device]

Figure 1:
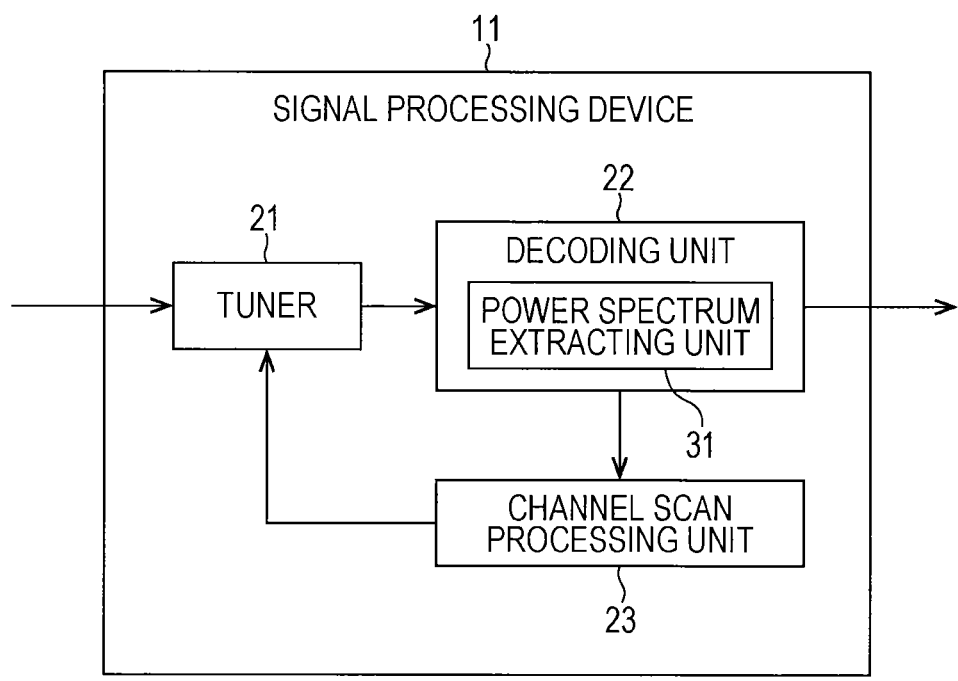
FIG. 1 is a block diagram for illustrating a structure example of an embodiment of a signal processing device to which the present technique is applied.

FIG. 1 illustrates a structure example of an embodiment of a signal processing device to which the present technique is applied. A signal processing unit 11 in FIG. 1 scans and stores a broadcast channel (which will also be hereinafter referred to simply as a channel) which can be received from an input signal received via an antenna that is not illustrated in the drawings. Moreover, the signal processing device 11 switches and outputs a stored channel when necessary.

The signal processing device 11 is provided with a tuner 21, a decoding unit 22 and a channel scan processing unit 23.

The tuner 21 receives an input signal while switching a band in chronological order by the channel scan processing unit 23, and supplies the input signal to the decoding unit 22.

The decoding unit 22 decodes and outputs an input signal of a channel supplied from the tuner 21. Moreover, the decoding unit 22 is provided with a power spectrum extracting unit 31, and supplies reception power, that is, power for each frequency band of a supplied input signal to the channel scan processing unit 23 as a power spectrum. It should be noted that a power spectrum herein is a spectrum waveform having a frequency on a horizontal axis and power (for example, a unit dB indicating reception power) on a vertical axis.

The channel scan processing unit 23 executes a channel scan process on the basis of a power spectrum supplied from the power spectrum extracting unit 31 of the decoding unit 22, performs channel scan for all bands of an input signal, and specifies and stores a valid channel.

[Structure Example of Channel Scan Processing Unit]

Figure 2:
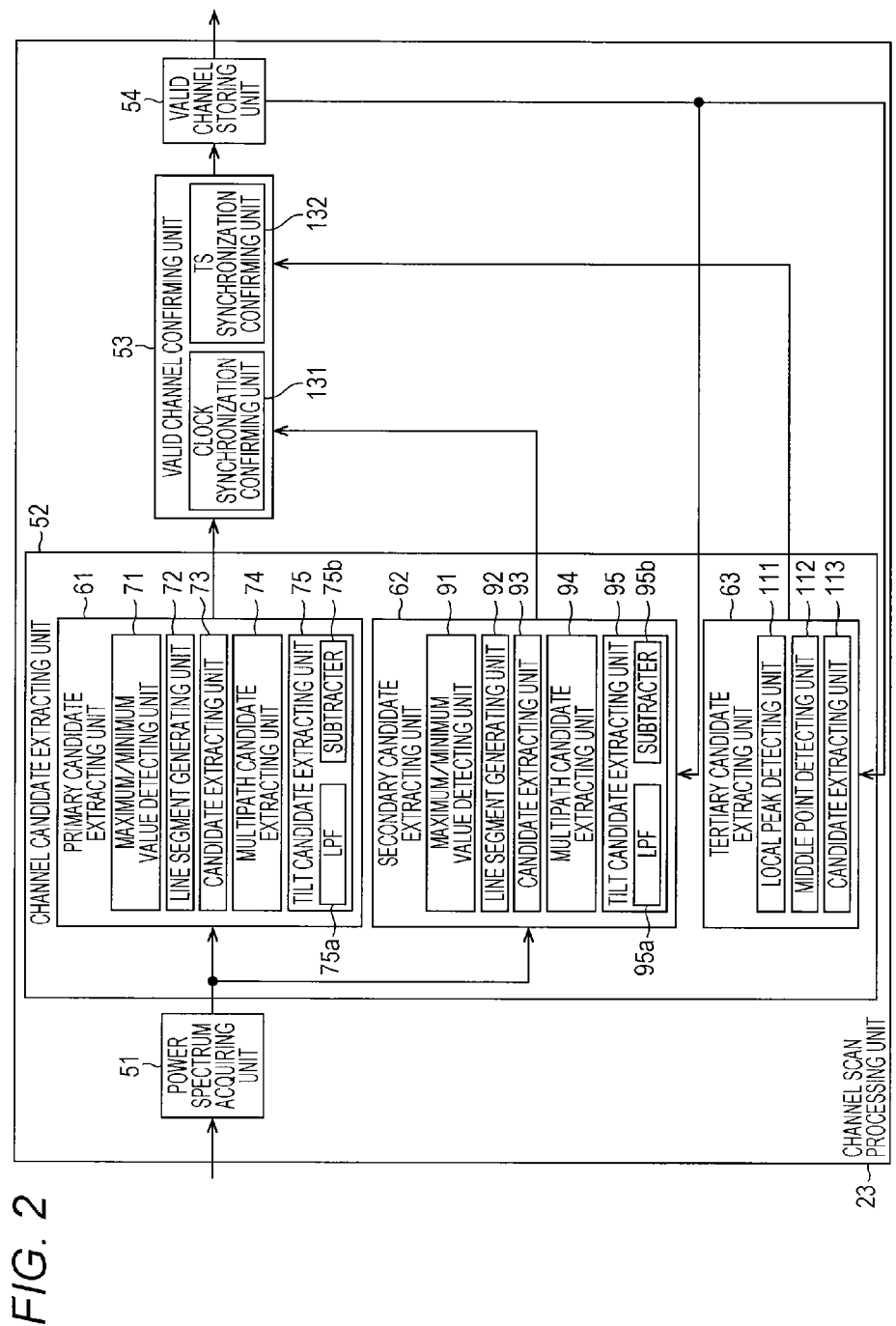
FIG. 2 is a block diagram for explaining a structure example of a channel scan processing unit in FIG. 1.

Next, a structure example of the channel scan processing unit 23 will be described with reference to the block diagram in FIG. 2.

The channel scan processing unit 23 is provided with a power spectrum acquiring unit 51, a channel candidate extracting unit 52, a valid channel confirming unit 53 and a valid channel storing unit 54.

The power spectrum acquiring unit 51 extracts a power spectrum supplied from the power spectrum extracting unit 31 of the decoding unit 22, and supplies the power spectrum to the channel candidate extracting unit 52.

The channel candidate extracting unit 52 extracts a band, which is to be a candidate of a channel, and supplies the band to the valid channel confirming unit 53.

More specifically, the channel candidate extracting unit 52 is provided with a primary candidate extracting unit 61 through a tertiary candidate extracting unit. The primary candidate extracting unit 61 extracts a channel candidate having a relatively high symbol rate, which is higher than 20 MSps, for example, from all bands of a power spectrum.

Moreover, a secondary candidate extracting unit 62 extracts a channel candidate of a band having an intermediate symbol rate, which is approximately between 5 and 20 MSps, for example, from a band excluding a band, from which a channel candidate has been extracted by the primary candidate extracting unit 61, of all bands of a power spectrum.

Furthermore, a tertiary candidate extracting unit 63 extracts a channel candidate having a symbol rate, which is lower than 5 MSps, for example, from a band excluding bands, from which channel candidates have been found by the primary candidate extracting unit 61 and the secondary candidate extracting unit 62, of all bands of a power spectrum. It should be noted that the primary candidate extracting unit 61 through the tertiary candidate extracting unit 63 may be configured to extract channel candidates having other symbol rates, as long as the magnitude relation of symbol rates of channel candidates to be extracted is satisfied.

Moreover, the primary candidate extracting unit 61 is provided with a maximum/minimum value detecting unit 71, a line segment generating unit 72, a candidate extracting unit 73, a multipath candidate extracting unit 74 and a tilt candidate extracting unit 75.

The maximum/minimum value detecting unit 71 detects a maximum value and a minimum value of a power spectrum supplied from the power spectrum acquiring unit 51. The line segment generating unit 72 sets interval lines in a scale form on a supplied power spectrum at regular intervals for a maximum value and a minimum value detected by the maximum/minimum value detecting unit 71, and sets a line segment on an interval line in an area sandwiched by a power spectrum. The candidate extracting unit 73 extracts a trapezoidal area on a power spectrum, in which a plurality of line segments having substantially equal center positions and substantially equal lengths exist, of line segments set by the line segment generating unit 72 as a channel candidate.

The multipath candidate extracting unit 74 sets a line segment in consideration of a multipath on a power spectrum and extracts a channel candidate. More specifically, the multipath candidate extracting unit 74 judges that a DIP (multipath DIP) between adjoining trapezoidal areas has been generated by a multipath regarding a trapezoidal area found on a power spectrum by the candidate extracting unit 73 as a channel candidate, and extracts a found trapezoidal area as a channel candidate in consideration of a multipath when no multipath DIP exists.

The tilt candidate extracting unit 75 assumes a state where a trapezoidal waveform, which is to be a channel candidate, has a tilt (is inclined) on a power spectrum and compensates a tilt component, which is to be an inclination component, and then extracts a channel candidate on the basis of a found trapezoidal waveform. More specifically, the tilt candidate extracting unit 75 is provided with an LPF (Low Pass Filter) 75a and a subtracter 75b, and extracts a tilt component by applying the LPF 75a to a power spectrum of an area having an inclined waveform and smoothing the power spectrum. Furthermore, the tilt candidate extracting unit 75 subtracts a tilt component from an original waveform utilizing the subtracter 75b, so as to extract a trapezoidal area, which is found by removal of apparent inclination, as a channel candidate.

The secondary candidate extracting unit 62 is provided with a maximum/minimum value detecting unit 91, a line segment generating unit 92, a candidate extracting unit 93, a multipath candidate extracting unit 94 and a tilt candidate extracting unit 95.

It should be noted that the maximum/minimum value detecting unit 91, the line segment generating unit 92, the candidate extracting unit 93, the multipath candidate extracting unit 94 and the tilt candidate extracting unit 95 (including an LPF 95a and a subtracter 95b) are provided with functions basically equal to those of the maximum/minimum value detecting unit 71, the line segment generating unit 72, the candidate extracting unit 73, the multipath candidate extracting unit 74 and the tilt candidate extracting unit 75 (including the LPF 75a and the subtracter 75b) except that symbol rates of the respective channel candidates to be extracted are lower than symbol rates at the primary candidate extracting unit 61, and description thereof will be omitted.

The tertiary candidate extracting unit 63 is provided with a local peak detecting unit 111, a constant power lowering point detecting unit 112 and a candidate extracting unit 113. The local peak detecting unit 111 detects a position, which is to be a peak, in a band excluding bands, from which channel candidates have been extracted by the primary candidate extracting unit 61 and the secondary candidate extracting unit 62, of all bands of a power spectrum. The constant power lowering point detecting unit 112 detects positions of two constant power lowering points, which are lower than the power (electric power) of the local peak point by a predetermined value at frequencies anterior to and posterior to the local peak point in bands anterior to and posterior to a position which is to be a local peak. The candidate extracting unit 113 extracts a trapezoidal area, which includes three points of the local peak point and the two constant power lowering points, as a channel candidate.

The valid channel confirming unit 53 confirms whether a band is valid as a channel or not on the basis of information on the band, which is to be a channel candidate, supplied from the channel candidate extracting unit 52. More specifically, the valid channel confirming unit 53 is provided with a clock synchronization confirming unit 131 and a TS synchronization confirming unit 132. The clock synchronization confirming unit 131 confirms whether synchronization of a clock required at an early stage in the process of demodulating a signal of a band extracted as a channel candidate can be achieved or not, and supplies information on a channel candidate, for which synchronization can be achieved, to the TS synchronization confirming unit 132.

The TS synchronization confirming unit 132 confirms whether synchronization required for reproduction of a TS (Transport Stream) generated at a final stage in a demodulation process can be achieved or not for a channel candidate for which synchronization of a clock has been confirmed by the clock synchronization confirming unit 131. That is, when TS synchronization can be confirmed, this means it is confirmed that a channel candidate is a valid channel. When it is confirmed that one of channel candidates is a valid channel, the valid channel confirming unit 53 causes the valid channel storing unit 54 to store information on a band, which is to be a channel candidate and which has been confirmed as a valid channel.

[Channel Scan Process]

Figure 3:
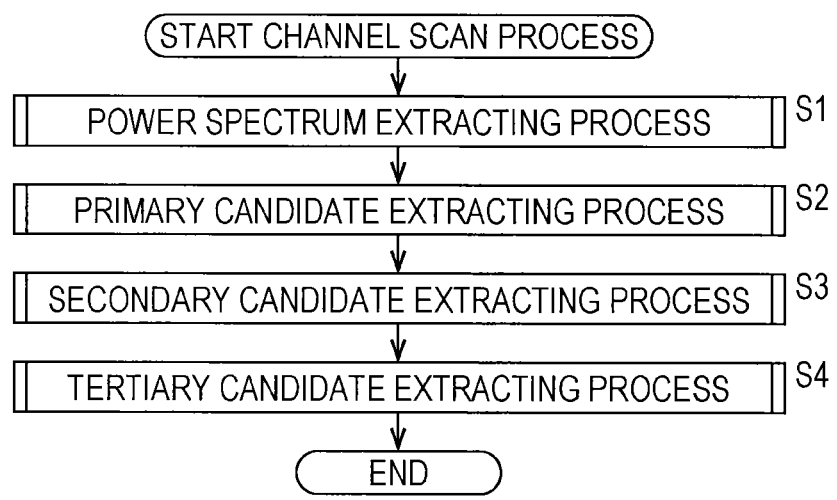
FIG. 3 is a flowchart for explaining a channel scan process at a channel scan processing unit in FIG. 1.

Next, a channel scan process will be described with reference to the flowchart in FIG. 3.

In step S1, the power spectrum extracting unit 31 of the decoding unit 22 executes a power spectrum extracting process so as to acquire, in chronological order, an input signal of a band which can be received by the tuner 21, finds a power spectrum for each frequency, and supplies the power spectrum to the channel scan processing unit 23. Regarding the power spectrum extracting process, refer to Japanese Patent Application Laid-Open No. 2010-278911 applied by the present applicant.

In step S2, the channel scan processing unit 23 executes a primary candidate extracting process so as to extract a valid channel having a relatively high symbol rate, which is higher than 20 MSps, for example, and causes the valid channel storing unit 54 to store the channel. It should be noted that detailed description on the primary candidate extracting process will be given later with reference to the flowchart in FIG. 4.

In step S3, the channel scan processing unit 23 executes a secondary candidate extracting process so as to extract a channel having an intermediate symbol rate, which is approximately between 5 and 20 MSps, for example, from a band excluding a band, from which a channel has been extracted, of all bands, and causes the valid channel storing unit 54 to store the channel. It should be noted that detailed description on the secondary candidate extracting process will be given later with reference to the flowchart in FIG. 9.

In step S4, the channel scan processing unit 23 executes a tertiary candidate extracting process so as to extract a channel having a relatively low symbol rate, which is lower than 5 MSps, for example, from a band excluding a band, from which a channel has been extracted, of all bands, and causes the valid channel storing unit 54 to store the channel. It should be noted that detailed description on the tertiary candidate extracting process will be given later with reference to the flowchart in FIG. 10.

With the above described processes, it becomes possible to extract a valid channel at high speed by extracting, in chronological order, channels stepwise in accordance with the height of a symbol rate from a channel having a symbol rate, which can be extracted at relatively high speed, excluding a band, from which a valid channel has been found, once and then extracting a channel having a low symbol rate, for which scanning takes time, stepwise.

[Primary Candidate Extracting Process]

Figure 4:
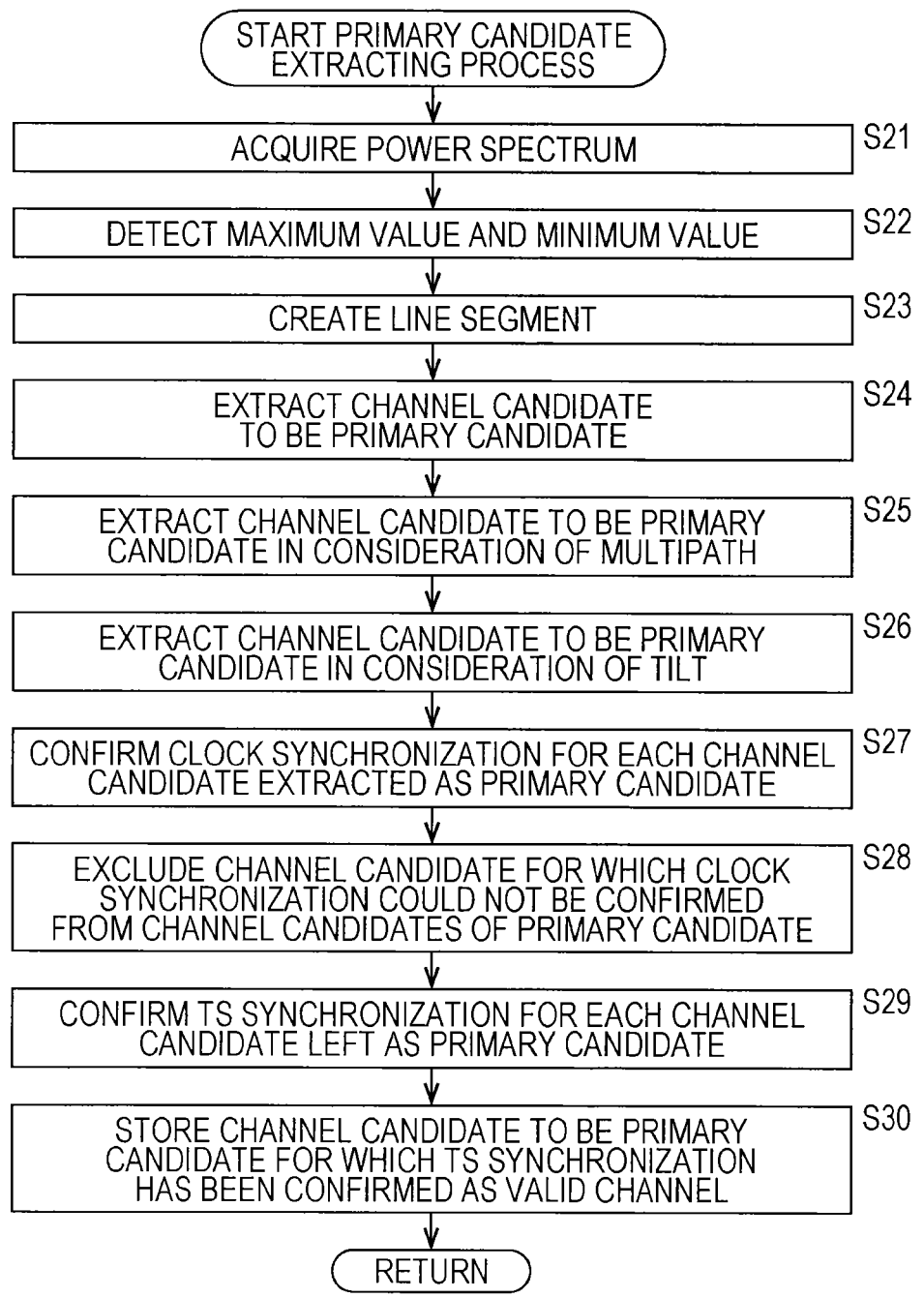
FIG. 4 is a flowchart for explaining a primary candidate process in FIG. 3.

Next, the primary candidate extracting process will be described with reference to the flowchart in FIG. 4.

Figure 5:
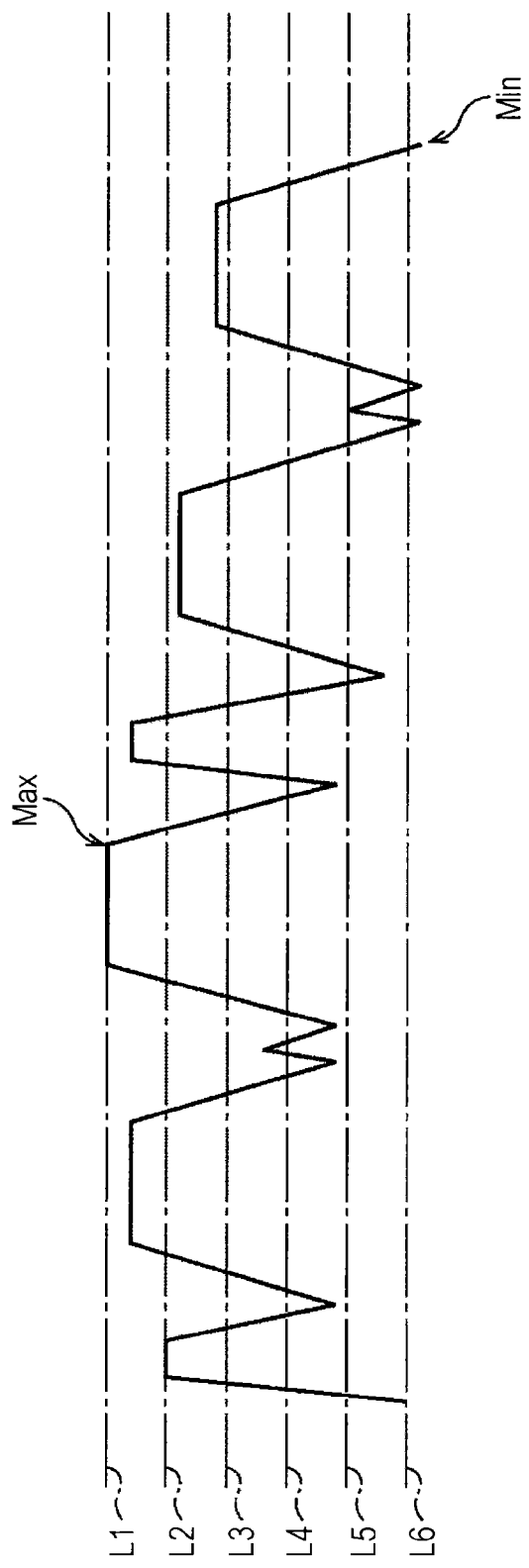
FIG. 5 is a diagram for explaining a method of setting a maximum value and a minimum value, and a method of setting a line segment.

In step S21, the power spectrum acquiring unit 51 acquires a power spectrum supplied from the decoding unit 22, and supplies the power spectrum to the channel candidate extracting unit 52. Thus, the primary candidate extracting unit 61 acquires a supplied power spectrum. A power spectrum has a waveform illustrated with a solid line in FIG. 5, for example. It should be noted that the horizontal axis of the power spectrum in FIG. 5 indicates a frequency and the vertical axis indicates power (reception power: dB).

In step S22, the maximum/minimum value detecting unit 71 detects a maximum value and a minimum value in the power spectrum. In the case of the power spectrum in FIG. 5, for example, the maximum/minimum value detecting unit 71 detects a maximum value Max and a minimum value Min in FIG. 5.

Figure 6:
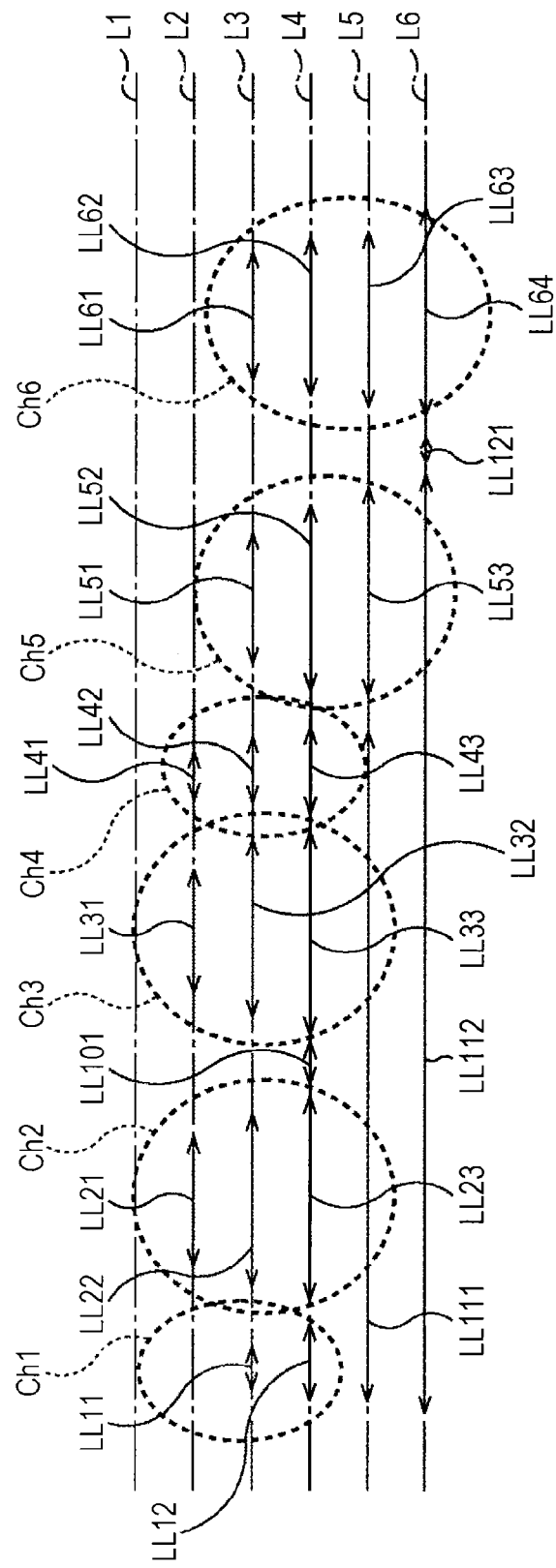
FIG. 6 is a diagram for explaining a way of finding a channel candidate.

In step S23, the line segment generating unit 72 generates a line segment, which is to be used for extracting a band to be a channel candidate, on a power spectrum on the basis of the power spectrum and information on a maximum value and a minimum value. More specifically, in the case of the power spectrum in FIG. 5, for example, the line segment generating unit 72 first draws pitch lines L1 to L6 at regular intervals between the maximum value Max and the minimum value Min as illustrated with alternate long and short dash lines. Next, the line segment generating unit 72 generates line segments on the above described pitch lines in a part included in a waveform which is projected on the power spectrum as illustrated in FIG. 6. More specifically, the line segment generating unit 72 generates line segments LL11, LL12, LL21 to LL23, LL31 to LL33, LL41 to LL43, LL51 to LL53, LL61 to LL64, LL101, LL111, LL112 and LL121 as illustrated with solid arrows in FIG. 6, for example.

In step S24, the candidate extracting unit 73 extracts a channel candidate, which is to be a primary candidate, on the basis of information on line segments. More specifically, the candidate extracting unit 73 judges that a trapezoidal waveform, which is considered to include a channel, exists in a band where a plurality of line segments, which have close center positions and similar lengths not shorter than a predetermined length, of segments exist, extracts the band as a channel candidate, and supplies the band to the valid channel confirming unit 53. It should be noted that being not shorter than a predetermined length herein means a length corresponding to a band having a symbol rate higher than 20 MSps, for example.

That is, in the case of FIG. 6, a channel candidate Ch1 formed with line segments LL11 and LL12 surrounded by a dotted line, a channel candidate Ch2 formed with line segments LL21 to LL23, and a channel candidate Ch3 formed with line segments LL31 to LL33 can be candidates. Moreover, a channel candidate Ch4 formed with line segments LL41 to LL43 surrounded by a dotted line, a channel candidate Ch5 formed with line segments LL51 to LL53, and a channel candidate Ch6 formed with line segments LL61 to LL64 can be candidates respectively. In this case, the candidate extracting unit 73 considers a mean value or a maximum value of the length of line segments, which compose each channel candidate, as a symbol rate, and extracts the symbol rate as a channel candidate having a mean frequency of a center position of line segments as a center frequency.

In FIG. 6, it should be noted that all of line segments LL101, LL111, LL112 and LL121 are excluded from channel candidates, since a line segment having a close center position and a similar length not shorter than a predetermined length does not exist.

Furthermore, when the length of the line segment LL21 in FIG. 6 is a bandwidth of 20 MSps, for example, channel candidates Ch1 and Ch4, which do not satisfy the condition that a length is not shorter than a predetermined length, of the candidate channels Ch1 to Ch6 are excluded, and Ch2, Ch3, Ch5 and Ch6 are extracted as channel candidates to be primary candidates.

Figure 7:
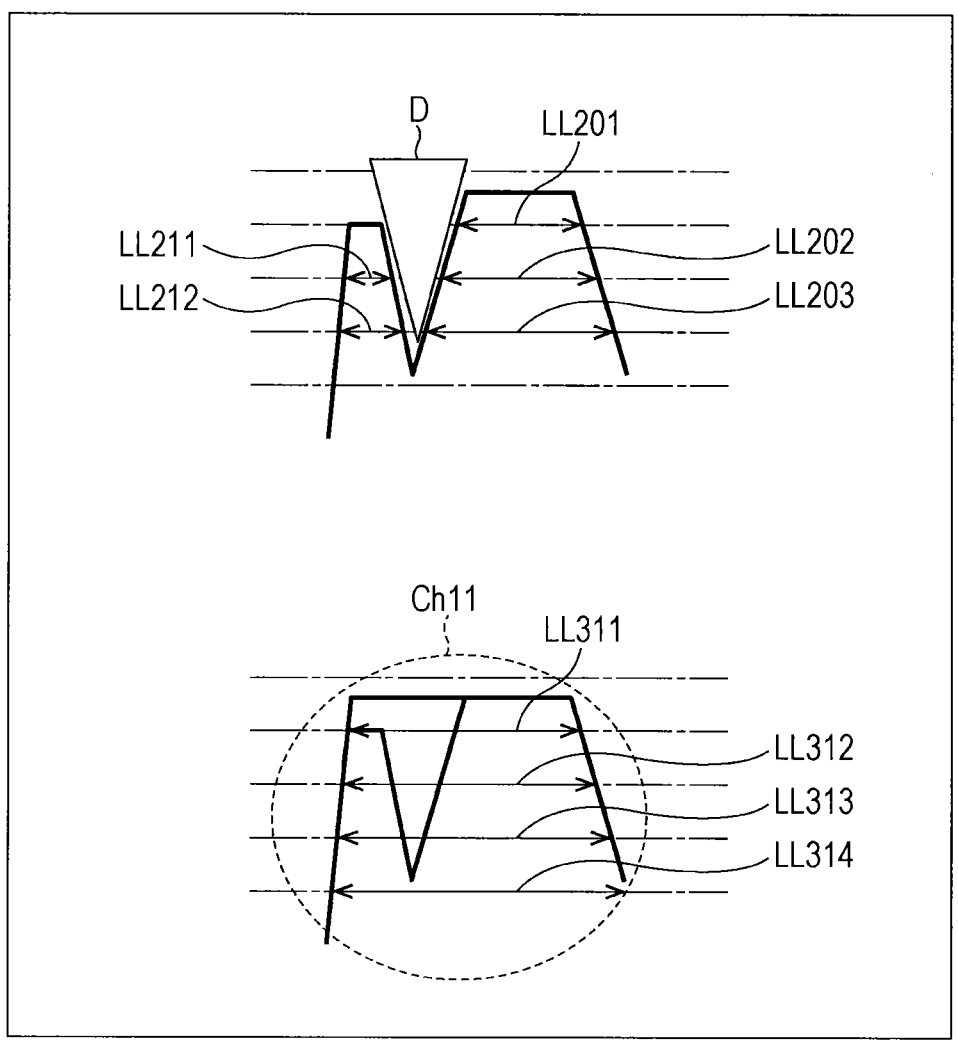
FIG. 7 is a diagram for explaining a way of finding a channel candidate in consideration of a multipath.

In step S25, the multipath candidate extracting unit 74 judges that a plurality of adjoining trapezoidal areas in a power spectrum are a trapezoidal area, which a multipath DIP has entered, to be one channel candidate in consideration of a multipath, extracts a channel candidate, and supplies the channel candidate to the valid channel confirming unit 53. More specifically, when a trapezoidal area to be a channel candidate which is formed with the line segments LL211 and LL212 and a trapezoidal area to be a channel candidate which is formed with the line segments LL201 to LL203 exist as illustrated at an upper part in FIG. 7, for example, the multipath candidate extracting unit 74 judges that the areas are the same trapezoidal area, which a multipath DIP D has entered, to be the same channel candidate obtained by a multipath as illustrated at a lower part in FIG. 7, and separately extracts the areas as a channel candidate. That is, in such a case, the multipath candidate extracting unit 74 considers that the line segments LL331 to LL314 exist as illustrated at the lower part in FIG. 7 with a dotted line, and extracts the area as a channel candidate Ch11.

Figure 8:
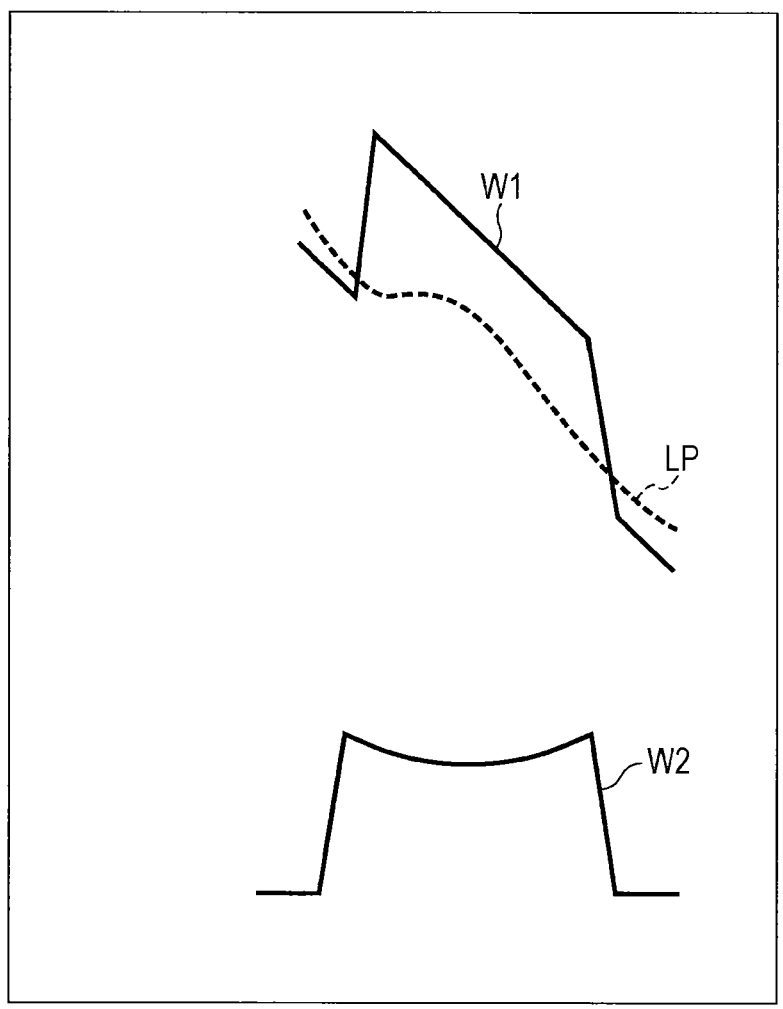
FIG. 8 is a diagram for explaining a way of finding a channel candidate in consideration of a tilt waveform.

In step S26, the tilt candidate extracting unit 75 fairs an area, which seems to have an inclined waveform, in a power spectrum into a trapezoidal waveform, extracts a channel candidate, and supplies the channel candidate to the valid channel confirming unit 53. More specifically, the tilt candidate extracting unit 75 detects a waveform which has an inclined trapezoidal waveform illustrated with the trapezoidal waveform W1 at an upper part in FIG. 8, for example, applies smoothing to a detection range with the LPF 75a, and finds a tilt component LP illustrated with a dotted line at the upper part in FIG. 8, for example. Furthermore, the tilt candidate extracting unit 75 controls the subtracter 75b and to subtract a tilt component LP1 from a trapezoidal waveform W1 which seems to be inclined, so as to find a trapezoidal waveform W2 illustrated at a lower part in FIG. 8, for example. The tilt candidate extracting unit 75 utilizes the trapezoidal waveform W2 found in such a manner to find a symbol rate and a center frequency as illustrated above, and extracts an inclined trapezoidal waveform as a channel candidate.

That is, as a result of the processes in steps S24 to S26, three types of channel candidates of a channel candidate which is found from a trapezoidal area included in an original power spectrum, a channel candidate which is obtained by including adjoining trapezoidal areas in consideration of a multipath, and a channel candidate which is found from an inclined trapezoidal area are extracted and supplied to the valid channel confirming unit 53. The valid channel confirming unit 53 stores the channel candidates in a memory which is not illustrated in the drawings.

In step S27, the valid channel confirming unit 53 controls the clock synchronization confirming unit 131 to confirm synchronization of a clock at an early stage, which is to be required for decoding, for each of channel candidates supplied in the above described series of processes. Synchronization of a clock to be performed here is synchronization of a clock which is required at the earliest stage in the synchronization process to be required in the process of decoding video and audio from a received signal of a channel at the decoding unit 22.

In step S28, the valid channel confirming unit 53 excludes a channel candidate, for which synchronization of a clock could not be confirmed by the clock synchronization confirming unit 131, from channel candidates stored in a memory which is not illustrated in the drawings. That is, regarding a channel candidate for which synchronization of a clock cannot be achieved, it is to be confirmed that even an early process required in the process of decoding cannot be performed, for example, and therefore it is confirmed immediately that the channel candidate is not a valid channel. Accordingly, a channel candidate for which clock synchronization cannot be confirmed is excluded from candidates since the channel candidate is not a valid channel.

In step S29, the valid channel confirming unit 53 controls the TS synchronization confirming unit 132 to respectively confirm synchronization of a TS (Transport Stream) only for channel candidates, for which synchronization of a clock has been confirmed, of channel candidates supplied in the above described series of processes. The synchronization of a TS to be performed here is a synchronization process required in the process of decoding video and audio from a received signal of a channel at the decoding unit 22, and is synchronization required in the end of decoding. That is, when synchronization of a TS is confirmed, this means that video and audio have been decoded correctly, and accordingly, it is confirmed that a channel extracted as a channel candidate is a valid channel.

In step S30, the valid channel confirming unit 53 causes the valid channel storing unit 54 to store a channel candidate, for which a clock has been synchronized by the clock synchronization confirming unit 131 and TS synchronization has been confirmed by the TS synchronization confirming unit 132, as a valid channel. It should be noted that TS synchronization to be performed by the TS synchronization confirming unit 132 is performed on the basis of information to be obtained as a result of actual execution of a decoding process by the decoding unit 22. Accordingly, TS synchronization requires more processing time than the confirmation process of clock synchronization in step S27. However, since clock synchronization is confirmed at a stage earlier than confirmation of TS synchronization so that TS synchronization is confirmed after a channel which is clearly to be excluded from channel candidates is excluded, it is possible to minimize the process of confirming whether a channel candidate is valid or not, and therefore it becomes possible to increase the processing speed.

As described above, it becomes possible with the primary candidate extracting process to extract a valid channel having a relatively high symbol rate, which is higher than 20 MSps, for example, at high speed and cause the valid channel storing unit 54 to store the channel.

[Secondary Candidate Extracting Process]

Figure 9:
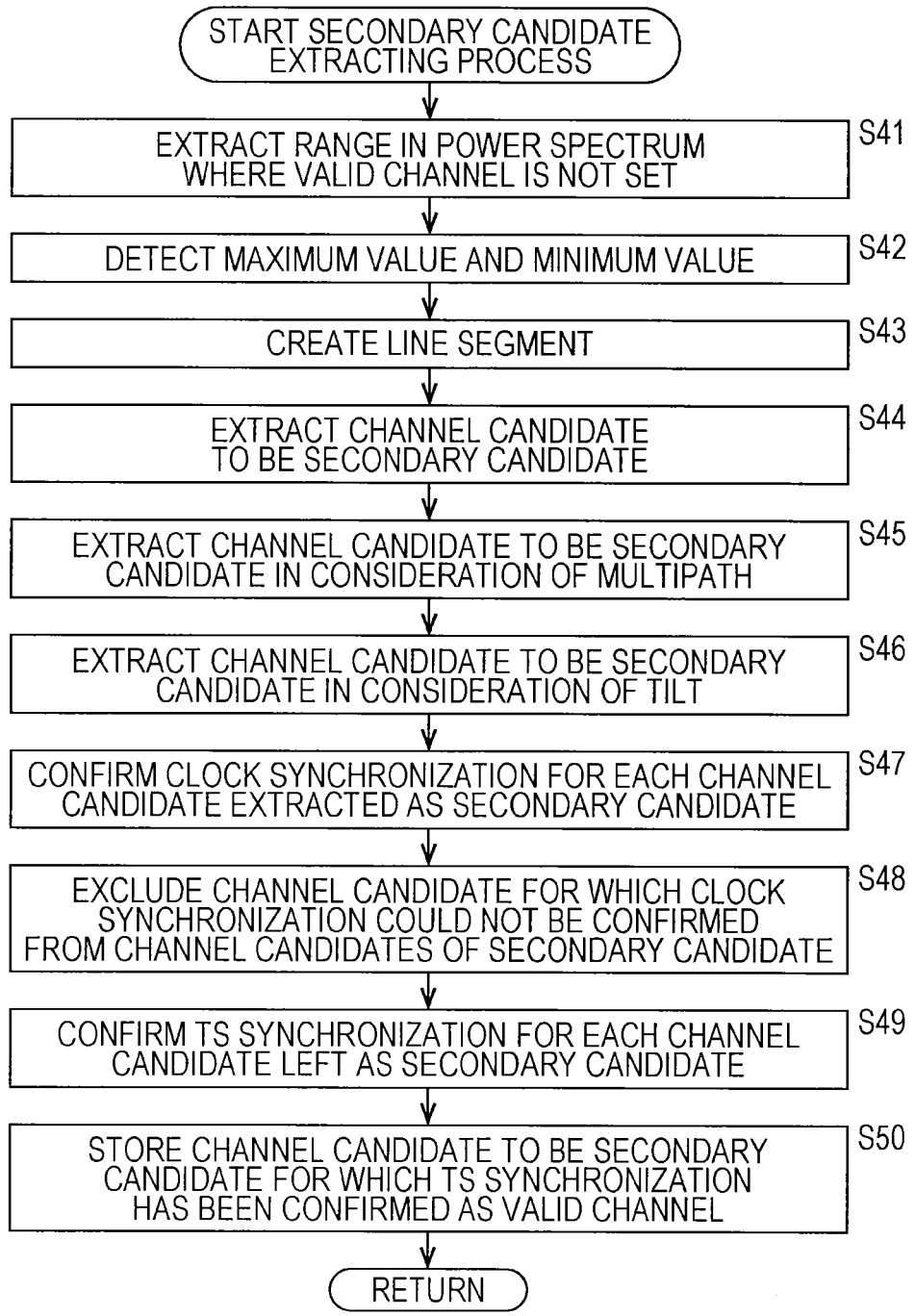
FIG. 9 is a flowchart for explaining a secondary candidate process in FIG. 3.

Next, the secondary candidate extracting process will be described with reference to the flowchart in FIG. 9. It should be noted that the basic processes of the secondary candidate extracting process to be described with reference to the flowchart in FIG. 9 are substantially similar except that a symbol rate of a channel to be extracted by the secondary candidate extracting process becomes lower than that of a channel candidate to be extracted by the primary candidate extracting process. Therefore, description on the processes in steps S42 to S50 will be arbitrarily omitted.

That is, in step S41, the secondary candidate extracting unit 62 accesses the valid channel storing unit 54 and acquires information on a channel which has been registered as a valid channel. The secondary candidate extracting unit 62 then excludes a band of a channel, which is registered as a valid channel, in a power spectrum, which is supplied from the power spectrum acquiring unit 51, from a processing object.

That is, as described with reference to FIG. 6, in a case where all of the channel candidates Ch2, Ch3, Ch5 and Ch6 in a power spectrum are extracted as valid channels and stored in the valid channel storing unit 54, the channel candidates Ch1 and Ch4 are to be extracted in the processes in the following steps S42 to S46 when the length of the line segment LL21 in FIG. 6 is a bandwidth of 20 MSps.

Furthermore, when it is judged in the processes in steps S47 to S50 that the channel candidates Ch1 and Ch4 are valid channels, the channel candidates Ch1 and Ch4 are respectively stored in the valid channel storing unit 54 as valid channels.

As described above, it becomes possible with the secondary candidate extracting process to extract a channel having an intermediate symbol rate, which is between 5 and 20 MSps, for example, as a valid channel. Moreover, by extracting a valid channel having a high symbol rate first in the primary candidate extracting process in this process, it is possible to extract a channel candidate having a lower symbol rate in a state where the bandwidth of the valid channel having a high symbol rate is excluded from a retrieval range, and therefore it becomes possible to increase the processing speed of channel candidate extraction in the secondary candidate extracting process.

[Tertiary Candidate Extracting Process]

Figure 10:
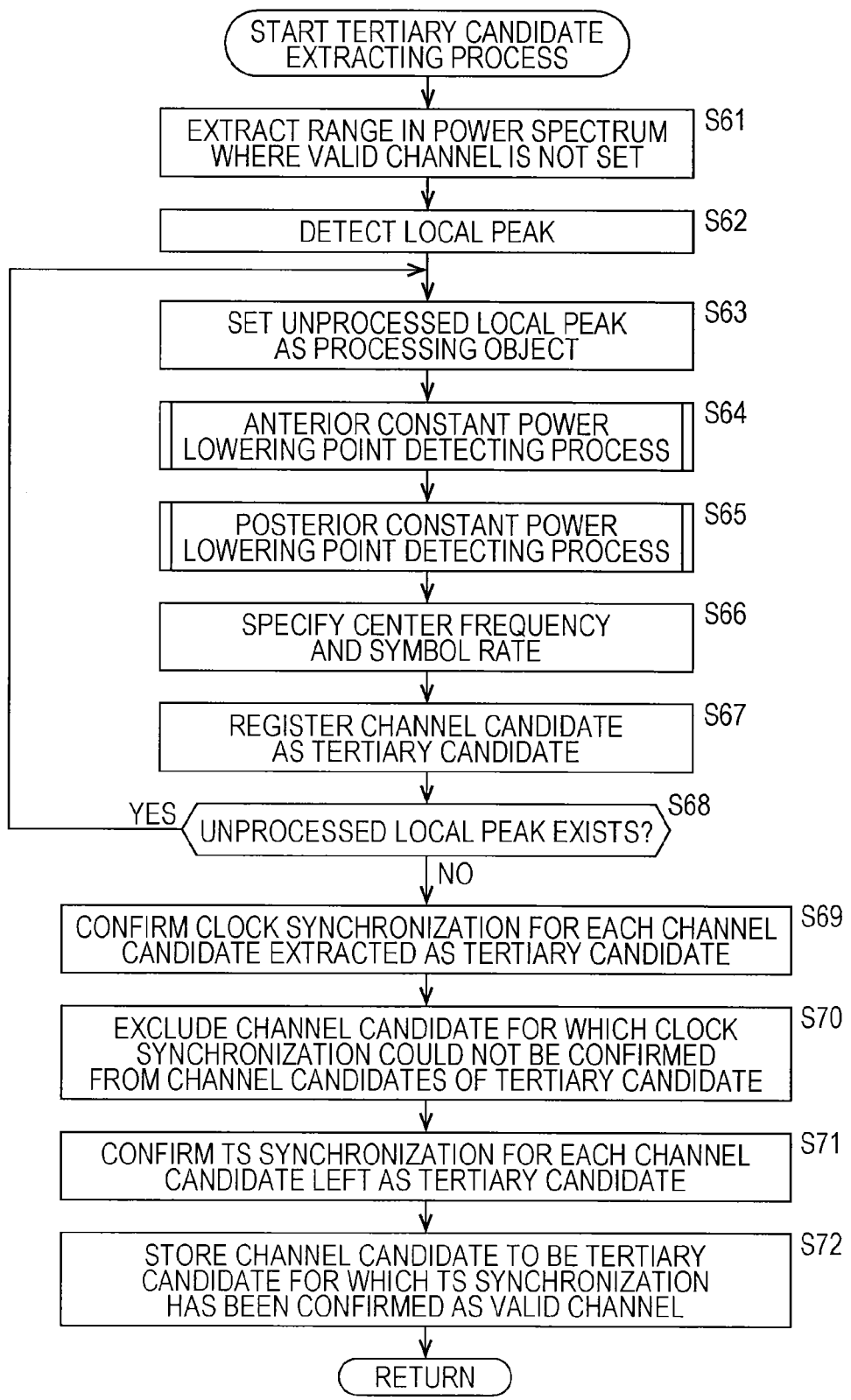
FIG. 10 is a flowchart for explaining a tertiary candidate process in FIG. 3.

Next, the tertiary candidate extracting process will be described with reference to the flowchart in FIG. 10. It should be noted that steps S69 to S72 in the flowchart in FIG. 10 are similar to steps S27 to S30 described with reference to FIG. 4, and therefore the description thereof will be arbitrarily omitted.

That is, in step S61, the tertiary candidate extracting unit 63 accesses the valid channel storing unit 54 and acquires information on a channel which has been registered as a valid channel. The tertiary candidate extracting unit 63 then excludes a band of a channel, which is registered as a valid channel, in a power spectrum, which is supplied from the power spectrum acquiring unit 51, from a processing object.

In step S62, the local peak detecting unit 111 detects a local peak in a band to be a processing object. More specifically, in the case of power SP1, SP11 and SP12, which are indicated by white triangles at an upper part in FIG. 11, for example, of power obtained at predetermined rough frequency intervals, the local peak detecting unit 111 detects power SP1, which is indicated by a black triangle, larger than anterior and posterior power SP11 and Sp12 as a local peak as illustrated at an middle part in FIG. 11. A plurality of such local peaks may possibly be detected, and the local peak detecting unit 111 stores frequencies and power detected respectively as local peaks.

In step S63, the constant power lowering point detecting unit 112 sets an unprocessed local peak of local peaks stored in the local peak detecting unit 111 as a processing object.

In step S64, the constant power lowering point detecting unit 112 executes an anterior constant power lowering point detecting process and detects an anterior constant power lowering point existing anterior to a frequency F to be a local peak (a constant power lowering point which exists in a direction of a frequency smaller than a frequency to be a local peak).

[Anterior Constant Power Lowering Point Detecting Process]

Figure 12:
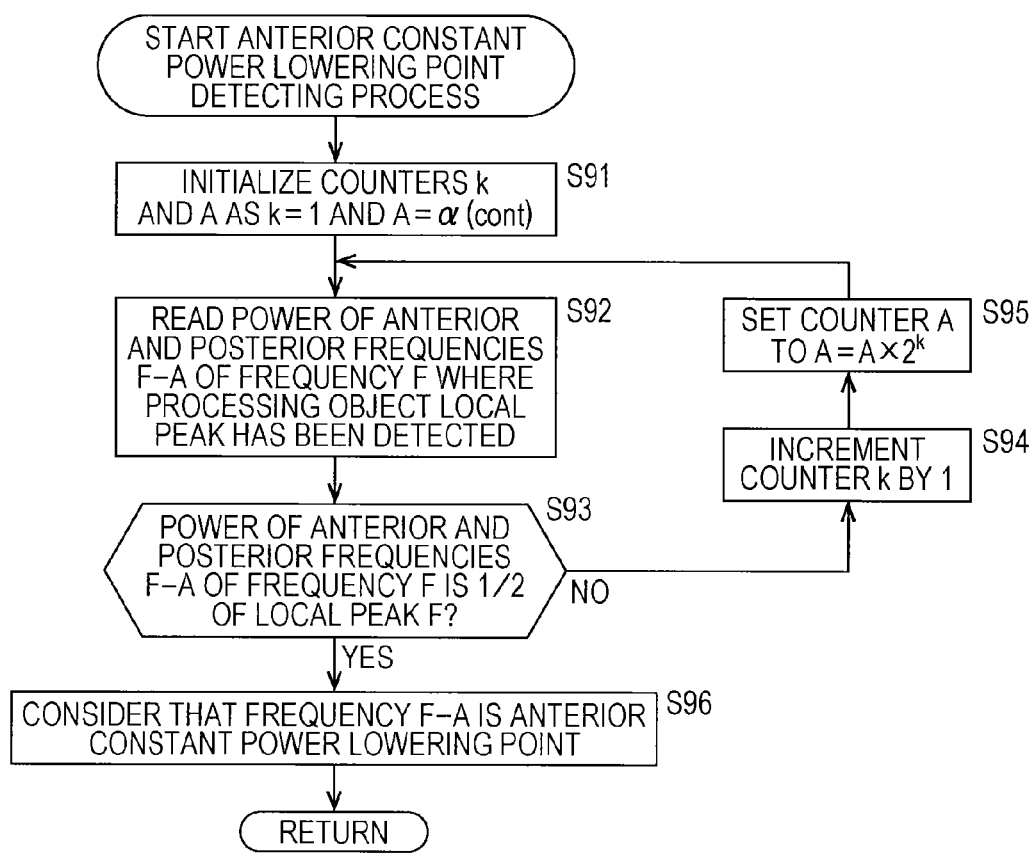
FIG. 12 is a flowchart for explaining an anterior constant power lowering point detecting process.

Here, an anterior constant power lowering point detecting process will be described with reference to the flowchart in FIG. 12.

In step S91, the constant power lowering point detecting unit 112 sets a counter k as k=1 and sets a counter A as A=α (a constant value: a value sufficiently small with respect to a rough frequency interval for detection of a local peak).

In step S92, the constant power lowering point detecting unit 112 detects power of anterior and posterior frequencies F–A for a frequency F of a local peak to be a processing object.

In step S93, the constant power lowering point detecting unit 112 determines whether power of both of detected frequencies F–A is smaller than ½ of the power of a local peak or not. That is, a point having constant value, which is as small as ½ of the power of a local peak, is judged as a constant power lowering point, and whether the point is a point having a corresponding frequency or not is determined.

In step S93, when power of both of detected frequencies F±A is not smaller than ½ of the power of a local peak, for example, the process goes to step S94.

In step S94, the constant power lowering point detecting unit 112 increments the counter k by 1.

In step S95, the constant power lowering point detecting unit 112 updates the counter A to A×2$^k$, and the process returns to step S92. That is, a frequency F of power SP1 detected as a local peak is repeatedly compared with power of anterior frequencies, which are spaced from the frequency F by distances varied by doubling respectively, in chronological order until it is judged that power is a constant power lowering point.

Figure 13:
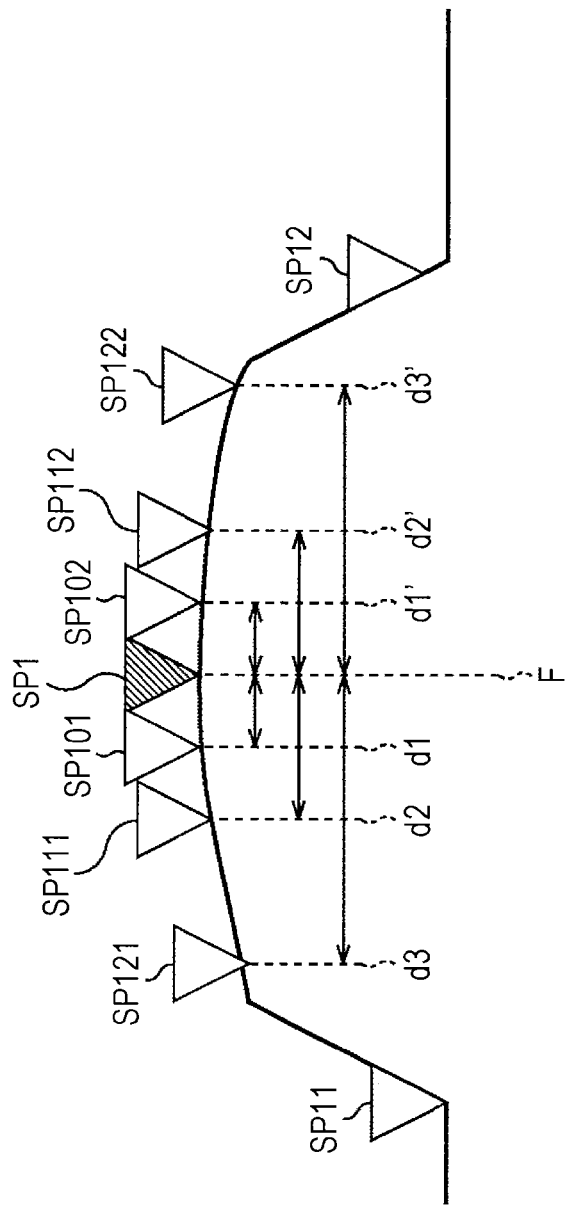
FIG. 13 is a diagram for explaining a method of detecting a constant power lowering point.

That is, as illustrated in FIG. 13, whether power SP101 to be a frequency F–A (A=d1) anterior to a frequency F is a constant power lowering point or not is determined in the first process for power SP1 which is a local peak. Here, when it is determined that the power is not a constant power lowering point, whether power SP111 of a frequency F–A (A=d2=2× d1) of A, which is updated by doubling, is a constant power lowering point or not is determined in the next process. Moreover, when it is determined here again that the power is not a constant power lowering point, whether a power SP121 of a frequency F–A (A=d3=2×d2=4×d1) of A, which is updated by doubling further, is a constant power lowering point or not is further determined in the next process.

That is, since necessary resolution becomes rougher as the symbol rate becomes higher, it becomes possible to widen an interval between powers to be compared, as a distance on a frequency from a frequency F to be a local peak increases. As a result, it becomes possible to detect a constant power lowering point at high speed while decreasing the number of power to be compared.

Figure 11:
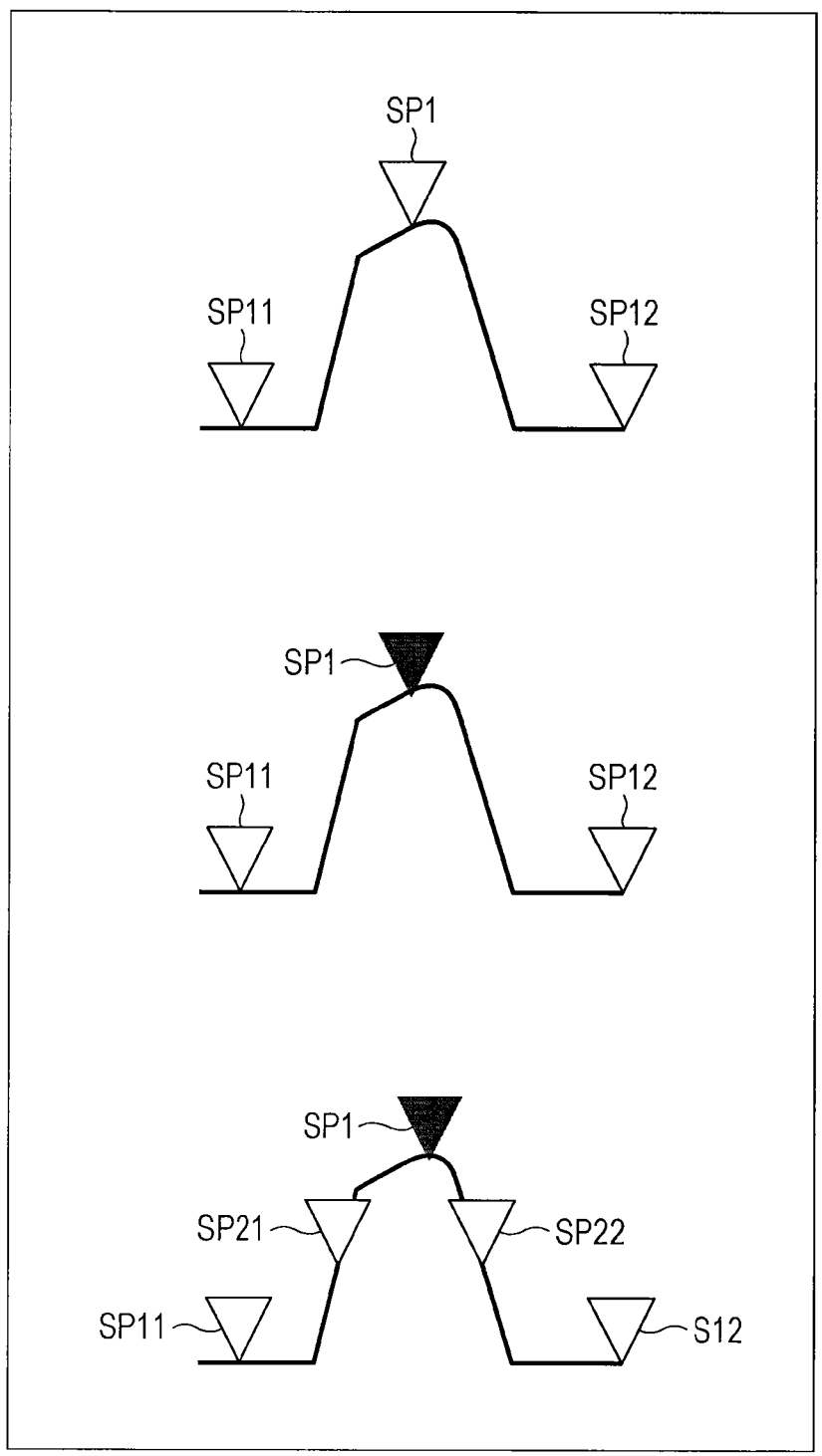
FIG. 11 is a diagram for explaining a method of detecting a constant power lowering point.

In addition, when it is determined in step S93 that power is a constant power lowering point to be ½ of the power SP1 to be a local peak as illustrated with power SP21 at a lower part in FIG. 11, for example, the process goes to step S96.

In step S96, the candidate extracting unit 113 judges that power at a frequency (F–A) is a constant power lowering point, which exists anterior to (exists in a direction of a frequency smaller than) a frequency of a local peak, and stores the power.

It becomes possible with the above described processes to detect a constant power lowering point at a frequency anterior to a frequency F to be a local peak at high speed.

Explanation now returns to the flowchart in FIG. 10.

In step S65, the constant power lowering point detecting unit 112 executes a posterior constant power lowering point detecting process to detect a constant power lowering point which exists posterior to (exists in a direction of a frequency larger than) a frequency to be a local peak. It should be noted that the posterior constant power lowering point detecting process is basically similar to the anterior constant power lowering point detecting process described with reference to FIG. 12, and description thereof will be omitted. Here, it is different in the fact that a counter A is added to a frequency F in the posterior constant power lowering point detecting process, and power SP22 is detected as a constant power lowering point as illustrated at the lower part in FIG. 11, for example. Moreover, in the case of retrieval of a posterior constant power lowering point, a distance from a frequency F is also set to be doubled in chronological order as illustrated with distances d1', d2' and d3' at power SP102, SP112 and SP122 in FIG. 12.

In step S66, the candidate extracting unit 113 calculates a center frequency and a symbol rate from information on a position on a frequency between two constant power lowering points, on the basis of information on an anterior constant power lowering point and on a posterior constant power lowering point. That is, a center frequency is found from a center position between power SP21 and SP22, which are constant power lowering points for a local peak SP11, and a symbol rate is found in a similar manner from a distance between the two points as illustrated at the lower part in FIG. 11.

In step S67, the candidate extracting unit 113 supplies a channel candidate of a center frequency and a symbol rate, which are calculated on the basis of a local peak and information on a symbol rate, to the valid channel confirming unit 53.

In step S68, the constant power lowering point detecting unit 112 determines whether an unprocessed local peak exists or not, and the process returns to step S63 when an unprocessed local peak exists.

That is, constant power lowering points are detected for all local peaks until all local peaks are processed, and the processes in steps S63 to S68 are repeated until a channel candidate to be a tertiary candidate is registered. In addition, when it is determined in step S68 that an unprocessed local peak does not exist, the process goes to step S69.

In addition, whether a channel candidate is valid or not is confirmed in the processes in steps S69 to S72, and only valid channels are stored in the valid channel storing unit 54.

With the above described processes, it is only required to extract a channel of a narrowband having a symbol rate lower than 5 MSps, for example, from a band excluding a band, from which a valid channel having a symbol rate higher than 5 MSps has been extracted, and a retrieval range is limited, and therefore extraction can be achieved at further high speed.

Moreover, it becomes possible with the series of channel scan processes not only to scan a valid channel at high speed but alto to prevent missing of reading of a valid channel, by excluding a band, from which a valid channel has been detected, in chronological order from a channel of a broadband having a high symbol rate while scanning a channel of a narrowband having a low symbol rate in chronological order.

It should be noted that the counter A used for description on detection of the above described constant power lowering point is desirably a frequency interval which sufficiently small with respect to a rough frequency interval in the process of finding a local peak. Moreover, although an example of detecting a constant power lowering point by doubling an interval of anterior and posterior frequencies for a local peak in chronological order has been described, the interval is not necessarily doubled and may be changed by 1.5 times or 3 times, for example, as long as the interval is set to be widened gradually. Furthermore, although an example of considering that a point having half power of the power of a local peak is a constant power lowering point in detection of a constant power lowering point has been described, it is only required that power lowers by constant power, and another condition may be used as a condition of a low power lowering point. For example, it may be considered that a point where power lowers by several dBs with respect to reception power at a local peak is a constant power lowering point.

The above described series of processes can be executed by hardware or can be executed by software. When the series of processes are to be performed by software, the programs forming the software are installed into a computer. Here, a computer includes a computer which is incorporated in dedicated hardware or a general-purpose personal computer which can execute various functions by installing various programs into the computer, for example.

Figure 14:
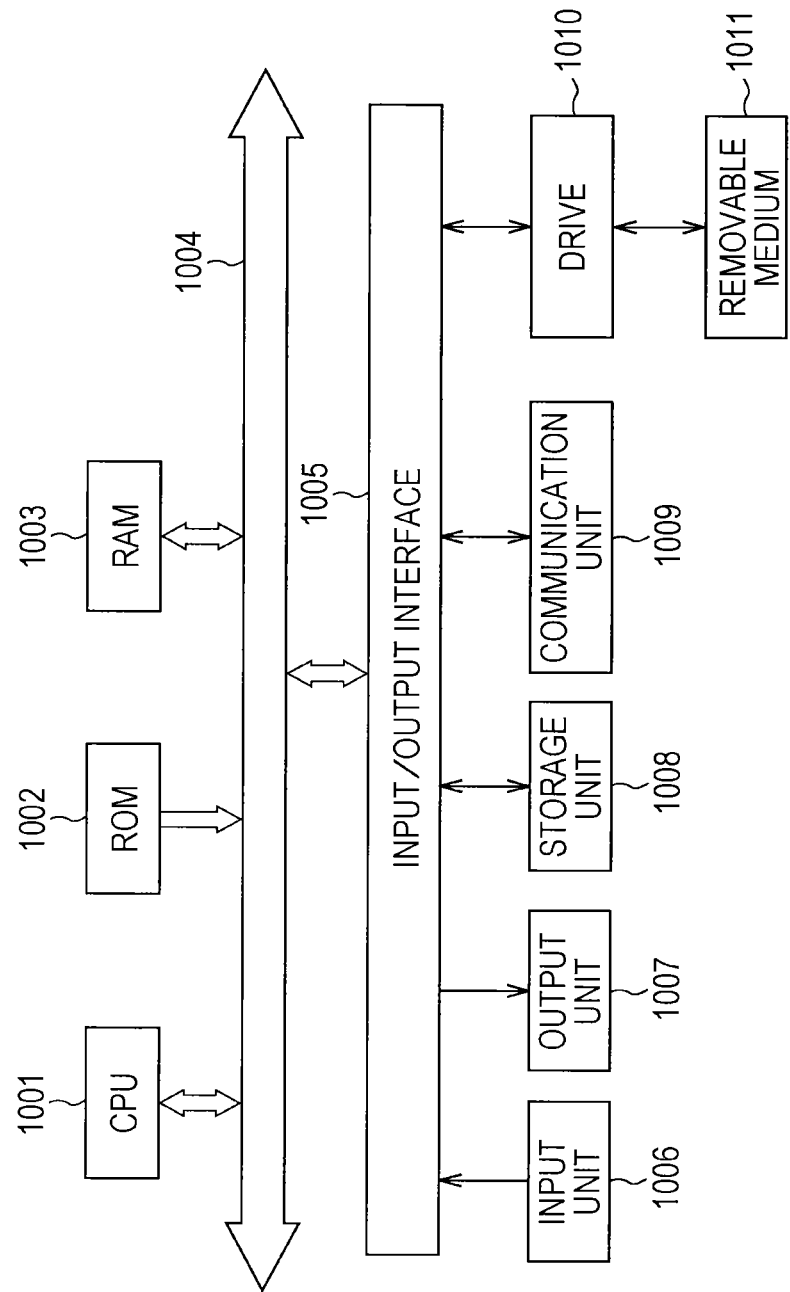
FIG. 14 is a diagram for explaining an example structure of a general-purpose personal computer.

FIG. 14 is a block diagram showing an example structure of the hardware of a computer that performs the above described series of processes in accordance with programs.

In the computer, a CPU (Central Processing Unit) 1001, a ROM (Read Only Memory) 1002, and a RAM (Random Access Memory) 1003 are connected to one another by a bus 1004.

An input/output interface 1005 is further connected to the bus 1004. An input unit 1006, an output unit 1007, a storage unit 1008, a communication unit 1009, and a drive 1010 are connected to the input/output interface 1005.

The input unit 1006 is formed with a keyboard, a mouse, a microphone, and the like. The output unit 1007 is formed with a display, a speaker, and the like. The storage unit 1008 is formed with a hard disk, a nonvolatile memory, or the like. The communication unit 1009 is formed with a network interface or the like. The drive 1010 drives a removable medium 1011 such as a magnetic disk, an optical disk, a magnetooptical disk, or a semiconductor memory.

In the computer having the above described structure, the CPU 1001 loads the programs stored in the storage unit 1008 into the RAM 1003 via the input/output interface 1005 and the bus 1004, and executes the programs, so that the above described series of processes are performed.

The programs to be executed by the computer (the CPU 1001) may be recorded on the removable medium 1011 as a package medium to be provided, for example. Alternatively, the programs can be provided via a wired or wireless transmission medium such as a local area network, the Internet, or digital satellite broadcasting.

In the computer, the programs can be installed into the storage unit 1008 via the input/output interface 1005 when the removable medium 1011 is mounted on the drive 1010. Also, the programs may be received by the communication unit 1009 via a wired or wireless transmission medium, and be installed into the storage unit 1008. Alternatively, the programs may be installed beforehand into the ROM 1002 or the storage unit 1008.

The programs to be executed by the computer may be programs for performing processes in chronological order in accordance with the sequence described in this specification, or may be programs for performing processes in parallel or performing a process when necessary, such as when there is a call.

In this specification, a system means an assembly of components (apparatuses, modules (parts), and the like), and not all the components need to be provided in the same housing. In view of this, apparatuses that are housed in different housings and are connected to each other via a network form a system, and one apparatus having modules housed in one housing is also a system.

It should be noted that embodiments of the present technique are not limited to the above described embodiments, and various modifications may be made to them without departing from the scope of the present technique.

For example, the present technique can be embodied in a cloud computing structure in which one function is shared among apparatuses via a network, and processing is performed by the apparatuses cooperating with one another.

The respective steps described with reference to the above described flowcharts can be carried out by one apparatus or can be shared among apparatuses.

In a case where more than one process is included in one step, the processes included in the step can be performed by one apparatus or can be shared among apparatuses.

It should be noted that the present technique can have the following structures.

(1) A channel scan device including: a power spectrum extracting unit that extracts a power level for each frequency of an input signal as a power spectrum; and a first channel candidate extracting unit that estimates that a trapezoidal range of a waveform, which constitutes the power spectrum, is a channel candidate and extracting the range.

(2) The channel scan device according to (1), wherein the first channel candidate extracting unit estimates that a center position and a width of the trapezoidal range of a waveform, which constitutes the power spectrum, are a center frequency and a symbol rate of the channel candidate.

(3) The channel scan device according to (1) or (2), further including a second channel candidate extracting unit that extracts a channel candidate having a symbol rate lower than a predetermined symbol rate, by a procedure similar to a procedure of the first channel candidate extracting unit, from a band excluding a band, from which a channel candidate having a symbol rate higher than the predetermined symbol rate has been extracted, after a channel candidate having a symbol rate higher than the predetermined symbol rate is extracted from all bands by the first channel candidate extracting unit.

(4) The channel scan device according to any one of (1) to (3), wherein the first channel candidate extracting unit compensates a waveform, which includes a tilt component constituted of a predetermined slope, in a waveform of the power spectrum, and then extracts a trapezoidal range of a waveform in the power spectrum as a channel candidate.

(5) The channel scan device according to (4), further including: a low-pass filter for extracting the tilt component from a waveform of a power spectrum including the tilt component as a low-frequency component; and a subtracter for subtracting a tilt component extracted by the low-pass filter from a waveform including the tilt component, wherein the first channel candidate extracting unit controls the low-pass filter to extract a tilt component from a waveform of a power spectrum including the tilt component, and further controls the subtracter to subtract a tilt component extracted by the low-pass filter from a waveform including the tilt component, so as to compensate a waveform including the tilt component and then extract the trapezoidal range in a waveform of the compensated power spectrum as a channel candidate.

(6) The channel scan device according to any one of (1) to (5), wherein the first channel candidate extracting unit extracts a plurality of adjoining trapezoidal ranges of trapezoidal ranges of a waveform of the power spectrum as one channel candidate.

(7) The channel scan device according to any one of (1) to (6), further including a third channel candidate extracting unit that extracts a trapezoidal range, which constitutes a waveform of a power spectrum composed of a peak position of the power spectrum and two positions lower than the peak position by a predetermined value, as a channel candidate for a band excluding a band, from which a channel candidate has been extracted by the first channel candidate extracting unit.

(8) The channel scan device according to (7), wherein the third channel candidate extracting unit detects two positions lower than the peak position by a predetermined value by finding, in chronological order, values of a power spectrum at positions spaced from the peak position by stepwise distances for a band excluding a band, from which a channel candidate has been extracted by the first channel candidate extracting unit, and extracts a trapezoidal range of a waveform of a power spectrum, which is composed of a peak position of the power spectrum and two positions lower than the peak position by a predetermined value, as a channel candidate.

(9) The channel scan device according to any one of (1) to (8), including: a channel confirming unit that confirms whether one of channel candidates extracted by the channel candidate extracting unit is valid as a channel or not; and a channel storing unit that stores a channel which has been confirmed by the channel confirming unit as a valid channel.

(10) The channel scan device according to (9), further including: a clock synchronization confirming unit that confirms whether a clock required at an early stage in a demodulation process of a signal for the channel candidate can be synchronized or not; and a transport stream synchronization confirming unit that confirms whether synchronous reproduction of the transport stream at a final stage in the modulation process for a channel candidate for which synchronization has been confirmed by the clock synchronization confirming unit can be achieved or not, wherein the channel confirming unit confirms a channel candidate, for which it has been confirmed by the transport stream synchronization confirming unit that the transport stream can be reproduced, of channel candidates extracted by the channel candidate extracting unit as a valid channel.

(11) A channel scan method of a channel scan device, including the steps of: performing a power spectrum extracting process to extract a power level for each frequency of an input signal as a power spectrum; and performing a first channel candidate extracting process to estimate that a trapezoidal range of a waveform, which constitutes the power spectrum, is a channel candidate and extracting the range.

(12) A program causing a computer for controlling a channel scan device to function as: a power spectrum extracting unit that extracts a power level for each frequency of an input signal as a power spectrum; and a first channel candidate extracting unit that estimates that a trapezoidal range of a waveform, which constitutes the power spectrum, is a channel candidate and extracting the range.

REFERENCE SIGNS LIST

11 Signal processing device
21 Tuner
22 Decoding unit
23 Channel scan processing unit
31 Power spectrum extracting unit
51 Power spectrum acquiring unit
52 Channel candidate extracting unit
53 Valid channel confirming unit
54 Valid channel storing unit
61 Primary candidate extracting unit
62 Secondary candidate extracting unit
63 Tertiary candidate extracting unit
71 Maximum/minimum value detecting unit
72 Line segment generating unit
73 Candidate extracting unit
74 Multipath candidate extracting unit
75 Tilt candidate extracting unit
91 Maximum/minimum value detecting unit
92 Line segment generating unit
93 Candidate extracting unit
94 Multipath candidate extracting unit
95 Tilt candidate extracting unit
111 Local peak detecting unit
112 Constant power lowering point detecting unit
113 Candidate extracting unit
131 Clock synchronization confirming unit
132 TS synchronization confirming unit

The invention claimed is:

1. A channel scan device comprising:
a power spectrum extracting unit that extracts a power level for each frequency of an input signal as a power spectrum;
a first channel candidate extracting unit that estimates that a trapezoidal range of a waveform, which constitutes the power spectrum, is a channel candidate and extracting the range; and
a second channel candidate extracting unit that extracts a channel candidate having a symbol rate lower than a predetermined symbol rate from a band excluding a band, from which a channel candidate having a symbol rate higher than the predetermined symbol rate has been extracted by the first channel candidate extracting unit.

2. The channel scan device according to claim 1, wherein the first channel candidate extracting unit estimates that a center position and a width of the trapezoidal range of a waveform, which constitutes the power spectrum, are a center frequency and a symbol rate of the channel candidate.

3. The channel scan device according to claim 1, wherein the first channel candidate extracting unit compensates a waveform, which includes a tilt component constituted of a predetermined slope, in a waveform of the power spectrum, and then extracts a trapezoidal range of a waveform in the power spectrum as a channel candidate.

4. The channel scan device according to claim 3, further comprising:
a low-pass filter for extracting the tilt component from a waveform of a power spectrum including the tilt component as a low-frequency component; and
a subtracter for subtracting a tilt component extracted by the low-pass filter from a waveform including the tilt component,
wherein the first channel candidate extracting unit controls the low-pass filter to extract a tilt component from a waveform of a power spectrum including the tilt component, and further controls the subtracter to subtract a tilt component extracted by the low-pass filter from a waveform including the tilt component, so as to compensate a waveform including the tilt component and then extract the trapezoidal range in a waveform of the compensated waveform of the power spectrum as a channel candidate.

5. The channel scan device according to claim 1, wherein the first channel candidate extracting unit extracts a plurality of adjoining trapezoidal ranges of trapezoidal ranges of a waveform of the power spectrum as one channel candidate.

6. The channel scan device according to claim 1, further comprising a third channel candidate extracting unit that extracts a trapezoidal range, which constitutes a waveform of a power spectrum composed of a peak position of the power spectrum and two positions lower than the peak position by a predetermined value, as a channel candidate for a band excluding a band, from which a channel candidate has been extracted by the first channel candidate extracting unit.

7. The channel scan device according to claim 6, wherein the third channel candidate extracting unit detects two positions lower than the peak position by a predetermined value by finding, in chronological order, values of a power spectrum at positions spaced from the peak position by stepwise distances for a band excluding a band, from which a channel candidate has been extracted by the first channel candidate extracting unit, and extracts a trapezoidal range of a waveform of a power spectrum, which is composed of a peak position of the power spectrum and two positions lower than the peak position by a predetermined value, as a channel candidate.

8. The channel scan device according to claim 1, comprising:
a channel confirming unit that confirms whether one of channel candidates extracted by the channel candidate extracting unit is valid as a channel or not; and
a channel storing unit that stores a channel which has been confirmed by the channel confirming unit as a valid channel.

9. The channel scan device according to claim 8, further comprising:
a clock synchronization confirming unit that confirms whether a clock required at an early stage in a demodulation process of a signal for the channel candidate can be synchronized or not; and
a transport stream synchronization confirming unit that confirms whether synchronous reproduction of a transport stream at a final stage in the demodulation process for a channel candidate for which synchronization has been confirmed by the clock synchronization confirming unit can be achieved or not,
wherein the channel confirming unit confirms a channel candidate, for which it has been confirmed by the transport stream synchronization confirming unit that the transport stream can be reproduced, of channel candidates extracted by the channel candidate extracting unit as a valid channel.

10. A channel scan method of a channel scan device, comprising the steps of:
performing a power spectrum extracting process to extract a power level for each frequency of an input signal as a power spectrum;
performing a first channel candidate extracting process to estimate that a trapezoidal range of a waveform, which constitutes the power spectrum, is a channel candidate and extracting the range; and
performing a second channel candidate extracting process to extract a channel candidate having a symbol rate lower than a predetermined symbol rate from a band excluding a band, from which a channel candidate having a symbol rate higher than the predetermined symbol rate has been extracted by the first channel candidate extracting process.

11. A non-transitory computer readable medium storing a program thereon, when executed by a computer, causes the computer to control a channel scan device to function as:
a power spectrum extracting unit that extracts a power level for each frequency of an input signal as a power spectrum;
a first channel candidate extracting unit that estimates that a trapezoidal range of a waveform, which constitutes the power spectrum, is a channel candidate and extracting the range; and
a second channel candidate extracting unit that extracts a channel candidate having a symbol rate lower than a predetermined symbol rate from a band excluding a band, from which a channel candidate having a symbol rate higher than the predetermined symbol rate has been extracted by the first channel candidate extracting unit.

* * * * *